Figure 4:
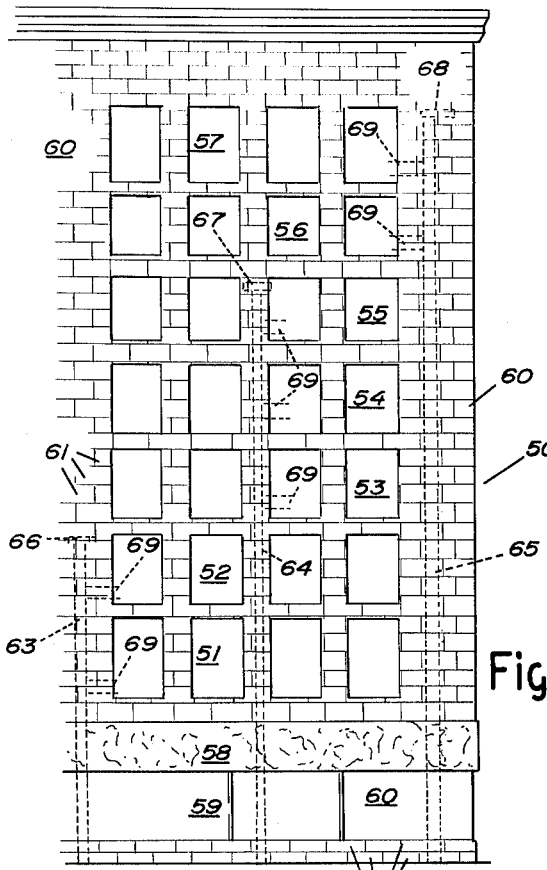

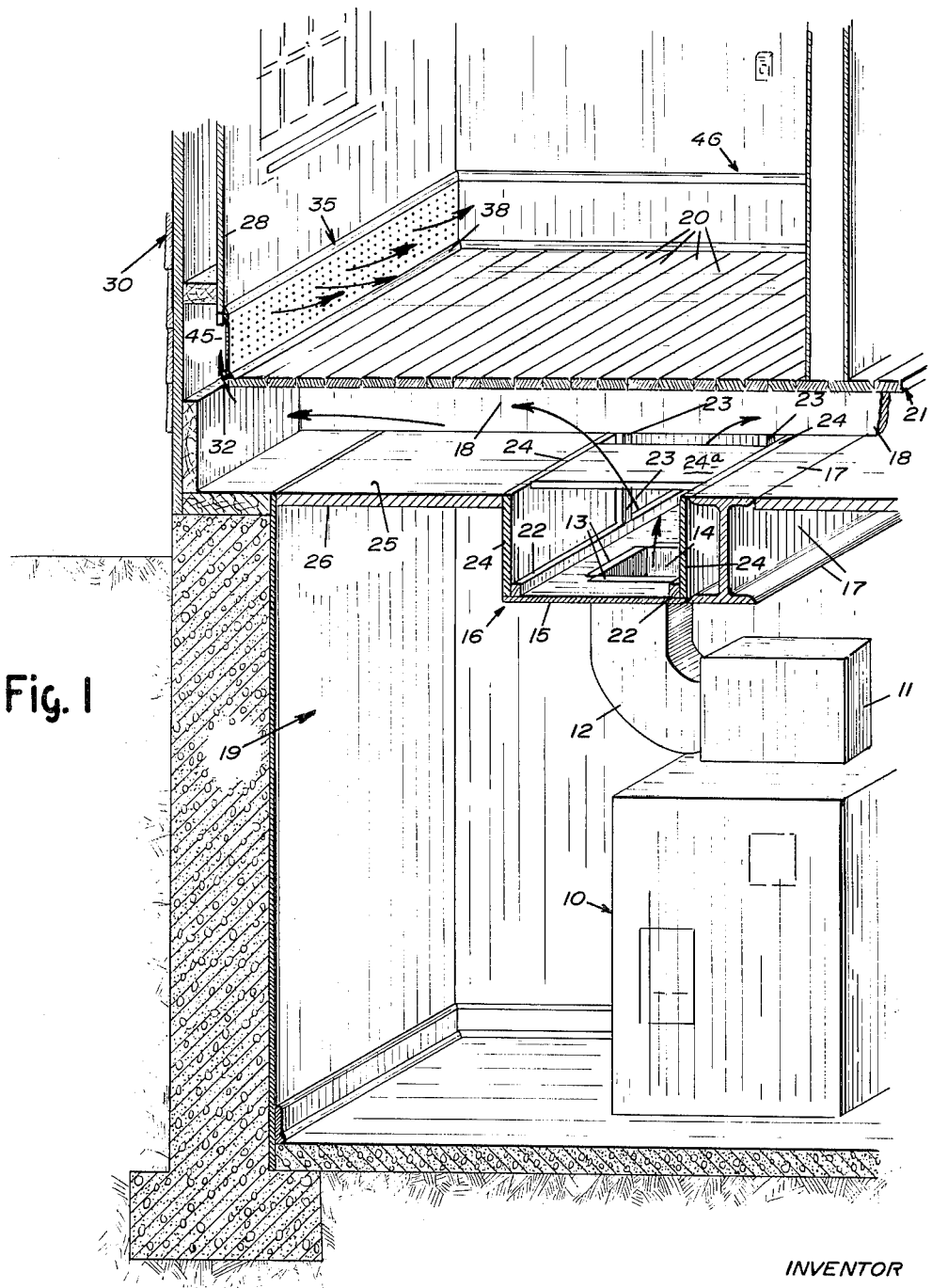

April 26, 1966  W. S. PHILLIPS, JR  3,247,895
AIR STORING AND CIRCULATING HEATING AND COOLING SYSTEM
Filed Feb. 6, 1962  2 Sheets-Sheet 2

INVENTOR
William S. Phillips, Jr.
by Felix A. Russell
Attorney

3,247,895
AIR STORING AND CIRCULATING HEATING AND COOLING SYSTEM

William S. Phillips, Jr., Arlington, Va., assignor, by mesne assignments, to Dorothy D. Phillips, Arlington, Va.
Filed Feb. 6, 1962, Ser. No. 171,473
7 Claims. (Cl. 165—50)

This invention relates to an air storing and circulating heating and cooling system and it consists in the combinations, constructions and arrangements of parts hereinafter described and claimed.

Generally there is provided a heating and cooling system employing a hot air furnace for heating and an air cooling unit for cooling, and a blower for forced circulation of the heated or cooled air through a building. A main air duct leads from the basement ceiling just under the joists and along the usual centrally located I-beam. This main duct is open over substantially its entire top area and discharges its conducted air into the spaces between the floor and its supporting joists, which spaces are converted into a multiplicity of heat storing and floor heating branch ducts by plywood or drywall ceiling panels nailed to and across the lower edges of the joists.

Heated or cooled air forced to the ends of the joist-defined branch ducts adjacent the outside walls of rooms of a building is discharged upwardly through peripheral openings in the floors produced by slotting or boring the last floor board or by omitting same. The discharge apertures so formed are covered by the lower edges of upright continuous perforated metal registers which simulate baseboards and which replace the same and the quarter round molding conventionally used therewith.

In two story houses or multi-storied buildings, the same system utilizing wall length baseboard registers and heat storing and floor warming joist-defined multiple ducts, is employed. In such construction, however, the heated or cooled air is conducted to the distribution system of each story by ducts in the outside walls, which ducts may be conveniently formed by aligning vertical passages in the concrete or cinder blocks of which the walls are built.

It is accordingly an object of the present invention to provide a forced air circulation air heating system utilizing a multiplicity of heat storing and floor heating ducts formed by closing the space between floor joists by insulating ceiling panels, whereby even and economical heating is obtainable.

It is another object of the invention to provide a system of the character described in which wall-length baseboard registers are coupled to the discharge ends of joist-defined ducts.

It is a further object of the invention to provide a multi-storied building with a system of the type disclosed in which feed ducts are provided for the upper stories as by aligning vertical passages in the blocks forming the walls.

It is still another object of the invention to generally improve the design and efficiency of a heating or cooling system of the type disclosed.

Figure 5:
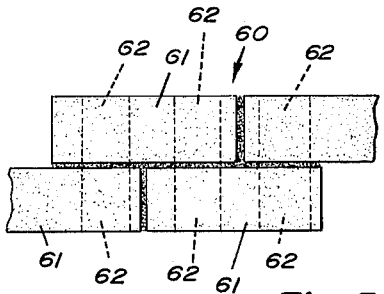
Figure 3:
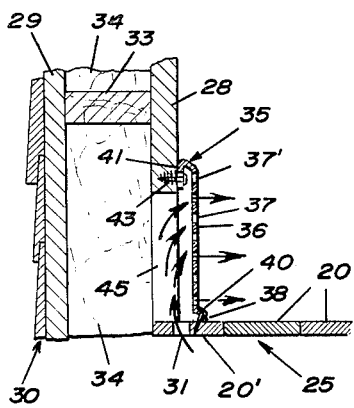
Figure 2:
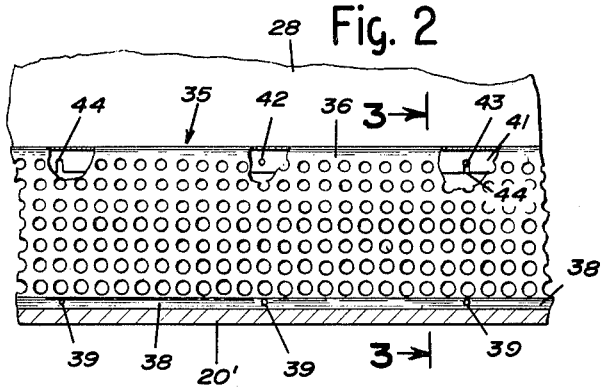

Other and further objects of the invention will become apparent from a reading of the following specification taken in conjunction with the drawings, in which:

FIGURE 1 is a perspective view in vertical section of a preferred embodiment of the invention, FIGURE 2 is an enlarged front elevational view, partly broken away, of a section of a baseboard register, FIGURE 3 is an end elevational view of the register of FIGURE 2, in section taken on line 3—3 of FIGURE 2, FIGURE 4 is an elevational view of a multi-storied building embodying the invention, and FIGURE 5 is an enlarged fragmentary elevational view of a portion of the wall of the building of FIGURE 4.

With reference now to FIGURES 1, 2 and 3 of the drawings, the numeral 10 generally designates a forced circulation air heating furnace having a bonnet 11 and a discharge duct 12, conventionally formed of sheet metal. The upper end of the duct 12 is flanged at 13 to overlie the margins of a rectangular aperture 14 cut in the bottom of a plywood or drywall panel 15 which forms the bottom wall of a main distribution duct generally designated 16. The duct 16 is shown conveniently located beside and along a conventional I-beam 17 which medially supports joists 18 forming the basic structure of the ceiling of a basement 19 and a support for boards 20 of the first story floor 21.

The main distribution duct 16 comprises a frame structure formed by a pair of horizontal wood strips 22 and a series of hanger strips 23 nailed thereto and to certain of the joists 18. The duct 16 is completed by a pair of side panels 24. A baffle plate 24a of asbestos composition board or equivalent material bridges the outlet 14 to prevent overheating of the floor thereabove.

The main distribution duct 16 is open over all or most of its top area for discharge of its heated (or cooled in summer) air into the spaces between the joists 18, which spaces constitute a multiplicity of parallel ducts 25. The upper wall of the ducts 25 are formed by the floor boards 20, the side walls by the joists 18 and the bottom walls by plywood or drywall panels 26 nailed to the under surfaces of the joists 18 and also constituting the ceiling panels of the basement space 19. The inner and/or outer surfaces of the various duct panels 15, 24 and 26 may be aluminized or otherwise treated to improve their appearance and/or their heat insulating and fire resistance characteristics, as desired.

The heated air discharges from the ducts 25 into the space between the inner and outer wall portions 28 and 29, respectively, of a conventional wall structure 30, through bores or slots 31 (FIG. 3) in the last floor board 20', or through a space 32 (FIG. 1) left by omission of the normally used last floor board. Conventional 2 x 4 fire stops 33 prevent the loss of heated air upwardly through the spaces between adjacent studs 34 (FIG. 3) and the inner and outer wall portions 28 and 29, thus forcing the air to flow into the room of FIG. 1 through a baseboard-simulating register 35 next to be described.

The register 35 comprises one or more strips 36 of sheet metal extending the full length or lengths of an outside wall of a room. The strips 36 are perforated at 37 to provide air vents. They are enameled or otherwise treated (for example, anodized if made of aluminum) for desired color and appearance. The lower edges of strips 36 are bent forwardly and curved downwardly at 38 to simulate quarter-round molding strips. The molding portions 38 are apertured at 39 to receive nails 40 for fastening the strips 36 to the floor board 20'.

The upper edges of the strips 36 are bent rearwardly upwardly and then abruptly to provide attachment flanges 41 parallel to the body portions proper of the strips 36. The attachment flanges are similarly provided with apertures 42 to receive nails or screws 43 insertable through aligned vent apertures 37'. If preferred, some or all of the apertures 42 may have substituted therefor downwardly opening slots 44 so that some or all of the screws 43 can be almost fully screwed into the wall portion 28 at accurately spaced points before placement of the register 35 by slipping the edges of the slots down behind the heads of the screws 43. The screws 43 then optionally may be tightened or friction nails or screws in holes 42 and/or nails or screws in portions 38 may be relied upon to hold the register 35 in place covering the opening 45 formed by cutting away or omitting the lowermost several inches of the wall portion 28.

For uniform appearance it is desirable that the baseboards 46 of the walls not provided with registers should be of the same general construction and material as the register baseboards 35, differing from the latter, if at all, primarily in omitting the venting perforations 37.

While the system as described, does not disclose a return duct system, it is contemplated that a conventional centrally located return duct, or branched return ducts with registers in all or most all of the rooms, will be employed.

In the multistoried form of the invention illustrated in FIGS. 4 and 5, a building generally designated 50 has a plurality of stories 51 through 57 above its ground floor 58 and its basement 59. The building 50 has walls 60 formed of masonry blocks 61. The blocks 61 have vertical tubular passages 62 therethrough which passages can be aligned as shown in FIG. 5 to form vertical air ducts, groups of contiguous ducts being connected in parallel to constitute supply duct groups schematically represented by columns 63, 64 and 65 in FIG. 4.

Column 63 conducts hot, or cool, air to stories 51 and 52 being capped or closed at 66 above the latter story. Similarly, column 64 supplies air to stories 53, 54 and 55 being capped at 67 and having outlets only at its respective supplied floors, while column 65 supplies only stories 56 and 57, being capped at 68. The numeral 69 designates the outlets from the columns to the distribution system for each story supplied by its respective column or group of wall conduits 62. Said distribution systems for the several stories may include any or all of the separate features described for the one-story dwelling of FIG. 1, as desired.

To comply with the building codes of the Builders' Official Conference of America (BOCA), the National Board of Fire Underwriters and the Underwriters' Laboratories in different areas, it may be necessary to substitute for the main distribution duct 16, a duct formed of sheet metal or of aluminum-covered fiber glass material (not shown), and to substitute small sheet metal lateral ducts (not shown) in each or in alternating joist spaces. The small ducts would be coupled by L's (not shown) to the top of the main duct, would rise gradually through the joist space, and would terminate at the top of the finished floor behind the metal registers 35, by being flattened somewhat and bent upwardly, or by having 45° L's (not shown) fitted thereon and flattened at their upper ends. Each small duct would heat the air in the enclosed joist spaces, to heat the floors (as previously described) and to make heat-storage reservoirs of said spaces.

While only several forms of the invention have been shown and described herein, it will be readily apparent to those skilled in the art that many minor modifications may be made without departing from the spirit of the invention or the scope of the appended claims.

What is claimed is:

1. A forced circulation air system for heating or cooling in connection with building spaces having joists and floors supported thereby, comprising: heat exchange means for changing the temperature of air circulated therethrough, means for forcing air through said heat exchange means, a main distribution duct connected to the outlet of said heat exchange means and extending transversely of and immediately beneath said joists, said main distribution duct being open over a major portion of its top area for discharge of air therefrom into the spaces between said joists, panels extending over the lower edges of said joists so as to define with said joists and said floors parallel ducts of relatively large collective volume and heat storage capacity, whereby said system provides more even room and floor temperatures and thereby increased thermal efficiency, baseboard register means provided with air discharge openings and extending over the base of at least a major portion of the length of an outside wall of a room of said building, means directing air from the discharge ends of said parallel ducts into an air distributing space defined in part and covered by said register means and a baffle plate of heat insulating and fireproof material interposed between said floor and the inlet into said main distribution duct from said heat exchanger means.

2. Structure according to claim 1, said panels being of plywood and serving as ceiling panels for space below said joists.

3. Structure according to claim 1, said panels being of the drywall composition board type.

4. Structure according to claim 1, said register means being formed of strips of ventilated sheet metal bent along their upper edges to define rearwardly extending spacing flanges and downwardly extending flange portions apertured to receive headed fastening elements for anchoring said strips to wall structure.

5. Structure according to claim 4, said strips having quarter round simulating bent margins along their lower edges apertured to receive headed anchoring elements.

6. Structure according to claim 5, certain of said apertures being slots permitting hooking of said strips over not fully inserted headed elements, said not fully inserted elements being accessible through aligned vents in said sheets for setting or removing of said elements.

7. Structure according to claim 1, the connection between the discharge ends of said parallel ducts and the space defined and covered by said register means being formed by apertures in the floor board underlying the lower edge of said register means.

References Cited by the Examiner

UNITED STATES PATENTS

| 2,182,686 | 12/1939 | Young | 165—49 |
| 2,195,691 | 4/1940 | Burt | 98—31 |
| 2,206,119 | 7/1940 | Parsons | 98—31 |
| 2,567,789 | 9/1951 | Sawyer | 165—57 |
| 2,598,842 | 6/1952 | Scott | 237—69 |

FREDERICK L. MATTESON, Jr., *Primary Examiner.*

CHARLES SUKALO, *Examiner.*